(12) United States Patent
Delgado et al.

(10) Patent No.: US 7,930,288 B2
(45) Date of Patent: Apr. 19, 2011

(54) KNOWLEDGE EXTRACTION FOR AUTOMATIC ONTOLOGY MAINTENANCE

(75) Inventors: Joaquin A. Delgado, Santa Clara, CA (US); Muralidhar Krishnaprasad, Fremont, CA (US); Ciya Liao, Fremont, CA (US)

(73) Assignee: Oracle International Corp., Redwood Shores, CA (US)

( * ) Notice: Subject to any disclaimer, the term of this patent is extended or adjusted under 35 U.S.C. 154(b) by 263 days.

(21) Appl. No.: 11/712,346

(22) Filed: Feb. 28, 2007

(65) Prior Publication Data

US 2008/0097968 A1 Apr. 24, 2008

Related U.S. Application Data

(60) Provisional application No. 60/853,496, filed on Oct. 20, 2006.

(51) Int. Cl.
*G06F 7/00* (2006.01)
(52) U.S. Cl. ......... 707/707; 707/706; 707/769; 707/777
(58) Field of Classification Search .............. 707/3, 100, 707/102, 706, 707, 769, 777
See application file for complete search history.

(56) References Cited

U.S. PATENT DOCUMENTS

2004/0243595 A1* 12/2004 Cui et al. ...................... 707/100
2006/0053144 A1* 3/2006 Hite et al. ..................... 707/102
2007/0038610 A1* 2/2007 Omoigui ........................... 707/3

OTHER PUBLICATIONS

Amit Sheth . ("Enterprise Applications of Semantic Web: The Sweet Spot of Risk and Compliance", Semagix, Inc,, Athens, GA, USA WWW.Semangix.com, , Aug. 25-27, 2005).*
Maedche et al. "Ontologies for Enterprise Knowledge Management", copyright 2003 IEEE.*

* cited by examiner

*Primary Examiner* — Etienne P LeRoux
*Assistant Examiner* — Cindy Nguyen
(74) *Attorney, Agent, or Firm* — Kraguljac & Kalnay, LLC

(57) ABSTRACT

Systems, methods, and other embodiments associated with extracting knowledge from application data and maintaining an ontology based on the extracted knowledge are described. One example system includes a mapping logic to store mappings between application objects and ontology classes and an information extraction (IE) logic that accesses the mapping logic to identify application data to process based on the mappings. The application data may be stored in application data repositories belonging to an enterprise and may be characterized by the application object. Having identified application data to process, the IE logic may locate data in the application data repositories and selectively manipulate an ontology based on selected application data elements.

29 Claims, 9 Drawing Sheets

KNOWLEDGE EXTRACTION FOR AUTOMATIC ONTOLOGY MAINTENANCE

CROSS REFERENCE TO RELATED APPLICATIONS

This application claims the benefit of U.S. Provisional Patent Application Ser. No. 60/853,496 filed Oct. 20, 2006, titled "Knowledge Extraction for Automatic Ontology Maintenance".

BACKGROUND

A semantic enterprise search seeks to add context to a search that may touch data available to an enterprise. The context may concern, for example, a user task, an enterprise task, a user identity, a user location, and so on. One way to reach data available to an enterprise is by using a crawler. The crawler may traverse an enterprise, seek out is data, and create and maintain an index to the data it discovers. Conventionally, a crawler may touch both structured and unstructured data.

Unstructured data may reside in unstructured document repositories including, for example, the Web, Intranets, content management systems, record management systems, email systems, and so on. Data may also reside in repositories that have rich structural information available (e.g., applications). That information may be under-utilized, if utilized at all.

A search engine may typically be used to access both the structured and unstructured data. The search engine may use the index created by the crawler. A search engine is typically tasked with retrieving lists of potentially relevant documents, leaving a user to manually analyze the potentially relevant documents and to identify knowledge of interest.

Searching may include examining metadata associated with documents. Metadata may be added automatically and/or manually to documents. This metadata may include scarce original metadata (e.g., author, title, creation date) and subsequently created metadata. Data for automatic metadata annotations may be identified by Information Extraction (IE) logic. Conventional IE logic may be tasked with identifying, for example, a document topic, a document theme, key concepts, most frequently used sentence subject, and so on. While IE and metadata annotations may have improved conventional searching, true semantic enterprise searching may not have been achieved.

BRIEF DESCRIPTION OF THE DRAWINGS

The accompanying drawings, which are incorporated in and constitute a part of the specification, illustrate various example systems, methods, and other embodiments of various aspects of the invention. It will be appreciated that the illustrated element boundaries (e.g., boxes, groups of boxes, or other shapes) in the figures represent one example of the boundaries. One of ordinary skill in the art will appreciate that in some embodiments one element may be designed as multiple elements, multiple elements may be designed as one element, an element shown as an internal component of another element may be implemented as an external component and vice versa, and so on. Furthermore, elements may not be drawn to scale.

DEFINITIONS

Figure 1:
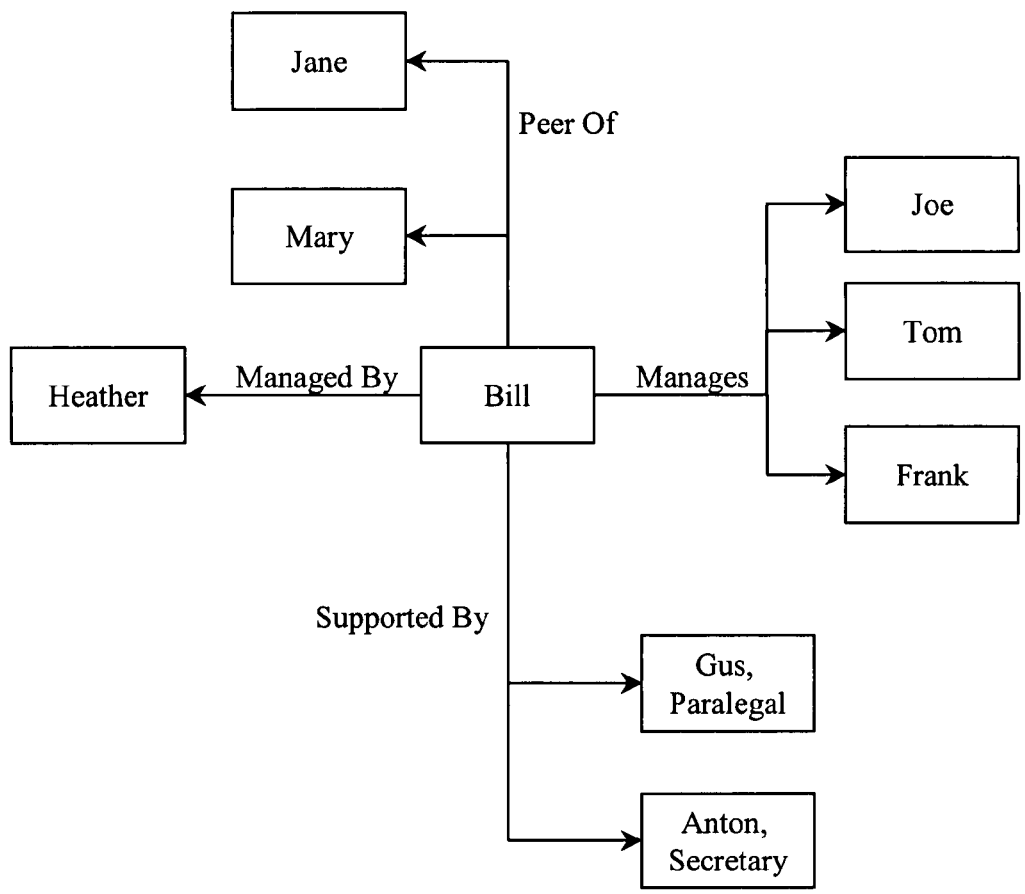
FIG. 1 illustrates a portion of an ontology.
Figure 2:
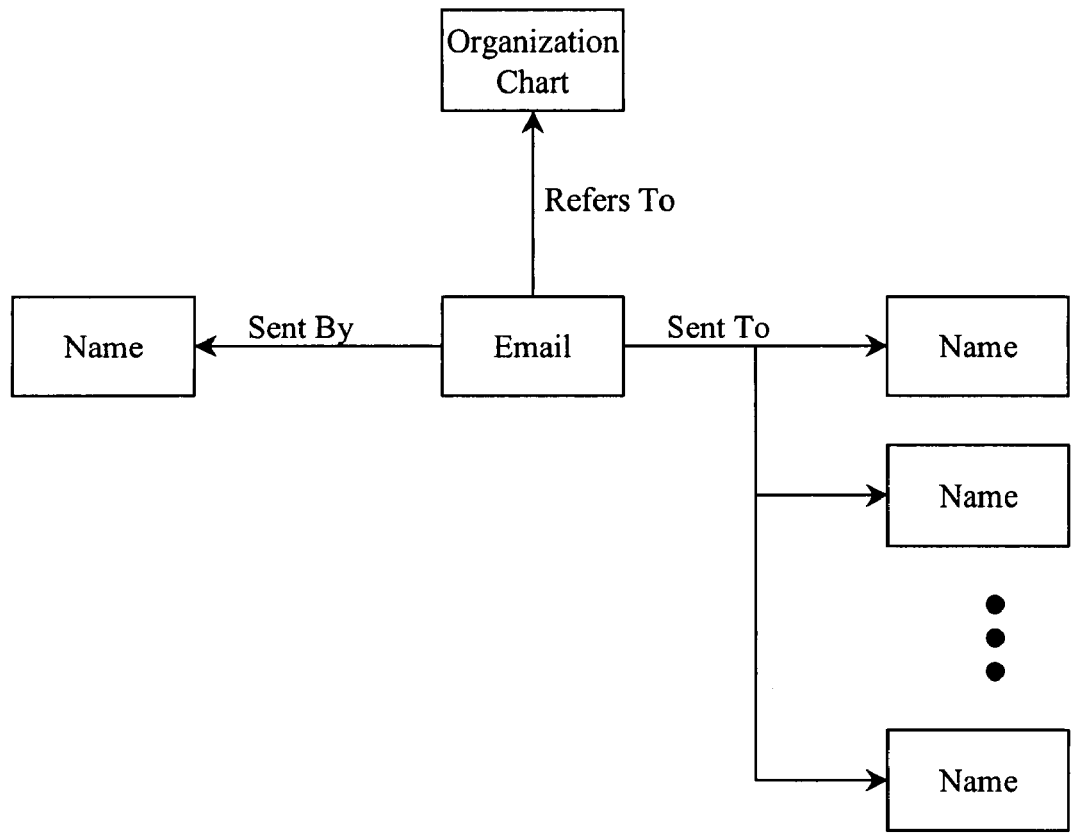
FIG. 2 illustrates a portion of an ontology.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Document", as used herein, refers to an item of information. A document may by, for example, a file, a web page, an email, a spread sheet, and so on. A document is accessible to a crawler by a uniform resource locator (URL).

"Enterprise", as used herein, refers to a set of computing resources belonging to an organization, where the organization may be a single entity and/or a formally defined collection of entities, and where the computing resources may include repositories of data and logic for processing data available in those repositories. An enterprise has identifiable boundaries and identifiable ownership.

"Object", is used herein in the computer science sense. An object may include both data and methods. An object may be defined by an object class, may be instantiated by a constructor, may exhibit polymorphism, and may belong to an inheritance tree.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element, or limitation. Furthermore, repeated use of the phrase "in one embodiment" does not necessarily refer to the same embodiment, though it may.

"Machine-readable medium", as used herein, refers to a medium that stores instructions and/or data that can be read by a machine (e.g., computer). A machine-readable medium may take forms, including, but not limited to, non-volatile media (e.g., optical disk, magnetic disk), and volatile media (e.g., semiconductor memory, dynamic memory). Common forms of machine-readable mediums include floppy disks, hard disks, magnetic tapes, RAM (Random Access Memory), ROM (Read Only Memory), CD-ROM (Compact Disk ROM), and so on.

"Logic", as used herein, includes but is not limited to hardware, firmware, software embodied as machine executable instructions stored on a machine-readable medium and/or combinations thereof to perform a function(s) or an action(s), and/or to cause a function or action from another logic, method, and/or system. Logic may include a software controlled microprocessor, discrete logic (e.g., application specific integrated circuit (ASIC)), an analog circuit, a digital circuit, a programmed logic device, a memory device containing instructions, and so on. Logic may include a gate(s), a combinations of gates, other circuit components, and so on. In some examples, logic may be fully embodied as software embodied as machine executable instructions stored on a machine-readable medium. Where multiple logical logics are described, it may be possible in some examples to incorporate the multiple logical logics into one physical logic. Similarly, where a single logical logic is described, it may be possible in some examples to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more computer instructions and/or processor instructions that can be read, interpreted, compiled, and/or executed by a computer and/or processor. Software causes a computer, processor, or other electronic device to perform functions, actions and/or behave in a desired manner. Software may be embodied in various forms including routines, modules, methods, threads, and/or programs. In different examples software may be embodied in separate applications and/or code from dynamically linked libraries. In different examples, software may be implemented in executable and/or loadable forms including, but not limited to, a stand-alone program, an object, a function (local and/or remote), a servelet, an applet, instructions stored in a memory, part of an operating system, and so on. In different examples, computer-readable and/or executable instructions may be located in one logic and/or distributed between multiple communicating, co-operating, and/or parallel processing logics and thus may be loaded and/or executed in serial, parallel, massively parallel and other manners. Software, whether an entire system or a component of a system, may be embodied as an article of manufacture and maintained or provided as part of a machine-readable medium.

DETAILED DESCRIPTION

Example systems and methods concern knowledge extraction for automatic ontology maintenance. In one example, systems and methods may concern applications based knowledge extraction and consolidation for automatic ontology instantiation. Thus, example systems and methods may automatically maintain an ontology based on knowledge extracted and consolidated from information associated with applications. Which knowledge is extracted from information associated with applications may depend on the ontology to be maintained. For example, knowledge to be extracted may depend on a mapping between an object associated with an application and an ontology class(es). The knowledge extracted may be used to update the ontology. The ontology may then be used to support a semantic and contextual search that operates, for example, on application data associated with unstructured documents. A review of applications, objects, and ontologies may facilitate understanding the example systems and methods.

An ontology may be represented by a graph of nodes connected by labeled arcs. An ontology may facilitate representing relationships between things. For example, nodes may represent things (e.g., people) and connecting labels may represent a relationship between the things. Nodes and relationships may be grouped, for example, into classes. Consider Figure One, which illustrates a portion of an ontology associated with people and relationships in a business.

Figure One illustrates a number of data items (e.g., Bill, Heather, Joe . . . ) and a number of named, labeled relationships (e.g., Bill manages Joe). Many applications process data items without built-in knowledge of relationships between the data items. For example, an email application may transmit data between people without understanding relationships within an email and/or between emails. The emails may contain unstructured data concerning the people. Thus, semantic searching of these emails may be limited, if possible at all. However, example systems and methods facilitate identifying and understanding structure in the data. Other applications may have a priori knowledge of the structure, which knowledge may be incorporated into application objects.

Consider a human resources application tasked with creating an organization chart. The human resources application may have intelligence for processing the data and perhaps even some of the relationships. This intelligence may be coded into objects. The human resources organization chart may have more structured data than the email application or the transmitted and stored emails. However, even the email application and data can be modeled using an ontology. Consider Figure Two, which illustrates a portion of an email-centric ontology.

Data associated with the "refers to", "sent by", and "sent to" relationships illustrated in Figure Two could be discovered by a crawler that examines transmitted and/or stored emails. The data discovered concerning the relationships and/or the subjects of relationships could be used to populate an ontology. Initially populating an ontology may be referred to as instantiating an ontology. With a populated ontology available, a search of emails could be extended beyond traditional parameters (e.g., keyword search, date search) to include parameters based on knowledge stored in the populated ontology. Thus, a semantic search may be facilitated by gathering information from documents to populate an ontology that will then support the semantic search.

Applications have domains that have characteristic data, relationships, and so on. The data, relationships, and even logic for processing the data and/or relationships may be stored in objects. For example, a human resource application may deal with people and thus store information (e.g., name, title, age) about people. The human resources application may also deal with relationships between people and thus may store information (e.g., manages, managed by, peer of, supported by) about the relationships. The human resource application may also have methods for getting, setting, and manipulating these values. Similarly, an email application may deal with emails and thus may store emails. The email application may also deal with transmitting and receiving emails and therefore may store information about the transmitting and receiving (e.g., sent by, sent to, responded to by, forwarded to). The email application object may also include methods for getting, setting, and manipulating these values.

Data and relationships can be captured in an ontology. Certain related collections of data and relationships may be referred to as classes. One way to capture data in an ontology is to map ontology classes to application objects that process the data and relationships. For example, data fields in an application object that refer to the subjects of relationships may be mapped to nodes in an ontology class. Similarly, data fields that refer to relationships may be mapped to arcs in an ontology class. Additionally, nodes returned from object methods that get or set relationship subject fields may be mapped to ontology class nodes and values returned from object methods that get or set relationship fields may be mapped to ontology class arcs.

Example systems and methods may include logic that uses an ontology to understand data (e.g., people, emails) and to understand relationships between data (e.g., between people, b/w emails). Example systems and methods may include logic that is guided by an ontology and/or a mapping between an ontology class and an application object concerning what knowledge to extract from application data. The extracted data can then be used to populate an ontology that can then support a semantic search. In one example, a semantic search may be progressively relaxed across available ontology node types and/or relationships.

In one example, IE may be used to extract and consolidate the knowledge. In one example, the IE may include Named Entity Recognition (NER) processing. For example, extracted knowledge can be used to populate a data structure (e.g., list, gazetteer) corresponding to an NER object and an ontology class. In addition to populating an ontology, NER can be applied while processing (e.g., parsing, indexing) both structured and/or unstructured data to create both new metadata annotations and new links that associate a document with an object that has been mapped to an ontology.

Figure 3:
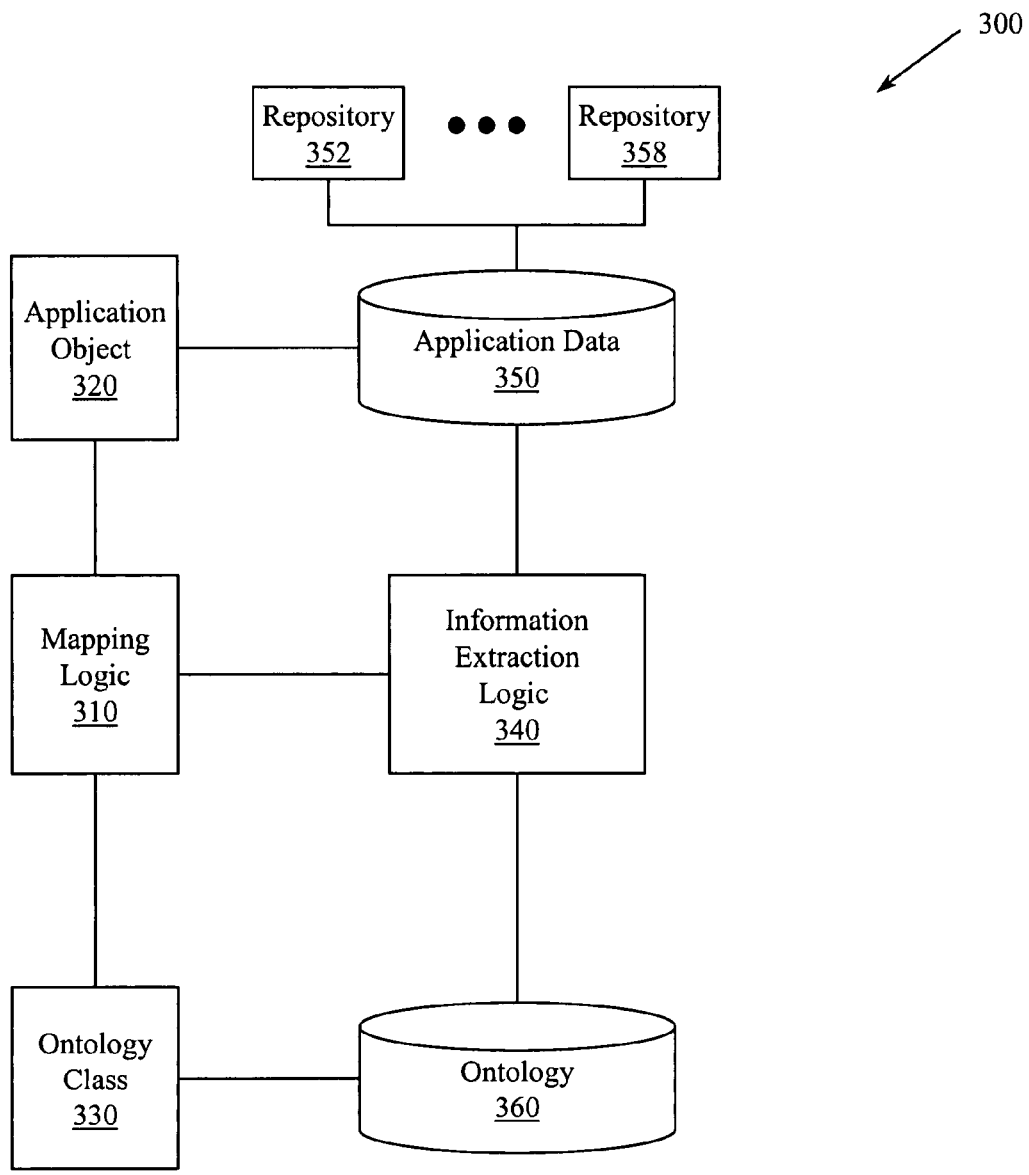
FIG. 3 illustrates an example system for knowledge extraction for automatic ontology maintenance.

FIG. 3 illustrates a system 300 for knowledge extraction for automatic ontology maintenance. System 300 may include a mapping logic 310 that stores a mapping between an application object 320 and an ontology class 330. As described above, the mapping may identify a correlation between a data element in application object 320 and a data element in an ontology class 330. The mapping facilitates identifying which data to look for in application data available to an enterprise.

Thus, system 300 may include an information extraction (IE) logic 340 that accesses the mapping logic 310 to gain information about a mapping(s) stored therein. Gaining information about a mapping(s) facilitates identifying a set of application data to process. For example, the mapping may identify that an application object 320 and an ontology class 330 both store information about people in an organization and relationships (e.g., managed by, manages) between the people. Portions of the application data 350 may be characterized by the application object 320. For example, the application object 320 may identify data types, data sizes, valid sets of values for data items, methods for accessing data types, and so on. Application data 350 may be stored in application data repositories (e.g., 352 . . . 358) that include, for example, file systems, content management systems, record management systems, email systems, calendar systems, and so on, belonging to an enterprise.

IE logic 340 may locate application data elements in application data repositories (e.g., 352 . . . 358) and then, upon locating an element, selectively manipulate an ontology 360 based on the located element. For example, when a data value that stores a value concerning the subject of a relationship is discovered, a node in ontology 360 may be updated. Similarly, when a data value that stores a value concerning a relationship is discovered, an arc in ontology 360 may be updated.

The IE logic 340 may locate information in different ways. In one example, the IE logic 340 may include a name entity relation (NER) logic to locate application data elements. The NER logic may be controlled, for example, by the mapping between the application object 320 and the ontology class 330. For example, the NER logic may identify data elements to locate based on the mapping. One task the NER logic may perform is to generate a gazetteer for an NER object. The gazetteer may then be used, for example, to populate an NER object(s).

Thus, the system 300 includes logic 310 to store a mapping between an application object 320 and an ontology class 330, and logic 340 to access that mapping and locate selected data elements based on the mapping. The logic 340 may also, upon locating selected data elements in application data 350, update an ontology 360.

Figure 4:
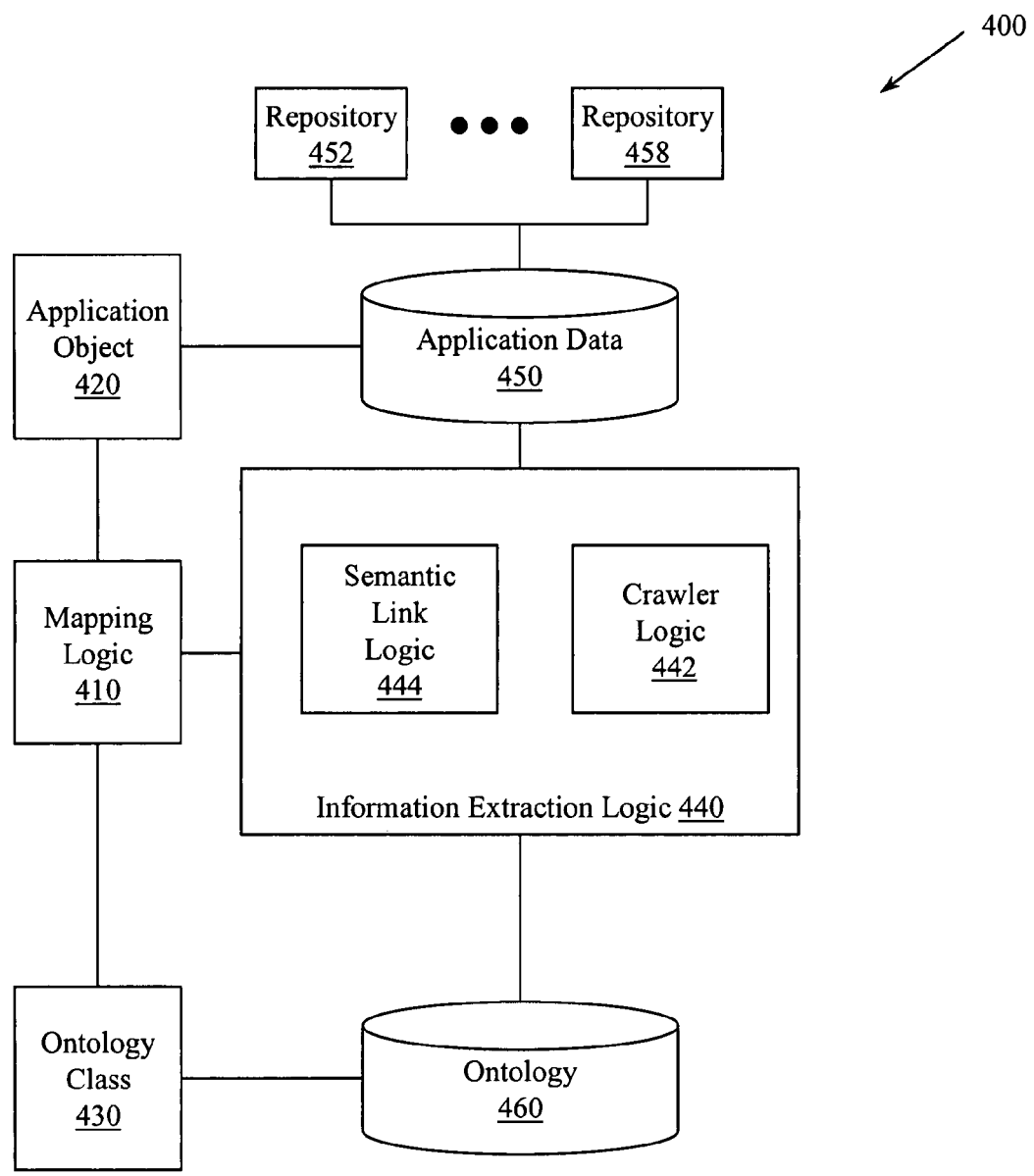
FIG. 4 illustrates an example system for knowledge extraction for automatic ontology maintenance.

FIG. 4 illustrates a system 400 for knowledge extraction for automatic ontology maintenance. System 400 includes several elements similar to those described in FIG. 3. For example, system 400 includes a mapping logic 410, an application object 420, and an ontology class 430. System 400 also includes an information extraction (IE) logic 440 that accesses application data 450 to maintain (e.g., instantiate, update) an ontology 460. The application data 450 may be stored in a set of data repositories (e.g., 452 . . . 458).

However, IE logic 440 may have additional capability and/or elements. For example, IE logic 440 may include a crawler logic 442 that can crawl the application data 450 to select data elements to be used to manipulate the ontology 460. Crawling the application data 450 may include, for example, crawling through data stored in the application data repositories (e.g., 452 . . . 458). Crawler logic 442 may perform an initial crawl, which may then be used to instantiate ontology 460. Crawler logic 442 may also perform additional (e.g., repetitive, scheduled) crawls to locate application data that has changed. Upon determining that a member of the application data 450 has changed since a previous crawl, and that the changed data is related to an element in ontology 460, IE logic 440 may selectively update ontology 460.

IE logic 460 may also include a semantic link logic 444. The semantic link logic 444 may establish a semantic link between a document from which a data element was selected and an application object 430 that characterizes the application data element. In this way, structure and semantic information may be added to previously unstructured data. For example, a stored email may not have included information identifying a chain of emails to which it belonged. A semantic link may be added to emails to identify that an email is part of a chain and to facilitate navigating the chain. For example, semantic links (e.g., reply to, forward from, predecessor of, successor of) may position an email in a chain of emails.

A crawling system, which may include a set of crawlers, may touch (e.g., locate, examine, retrieve from) many sources (e.g., repositories 452 . . . 458). A crawling system may include a crawler logic 442. Crawler logic 442 may retrieve data (e.g., content), metadata (e.g., title, type, creation date, modification date), and security information (e.g., access control list (ACL)) associated with a document. Information provided by a crawling system may be indexed, for example, by a search system to which the crawling system provides the information. The indexing may include organizing content and accessible user information (e.g., security settings), which can then be used to support queries.

Queries to locate relevant documents may thus interact with the index rather than trying to perform their own document level search. Crawler logic 442 can locate documents and detect whether a document or information associated with a document has changed since a previous crawl. For example, crawler logic 442 can identify changes to a document content, a document metadata, and a document security information (e.g., ACL). Additionally, crawler logic 442 may identify changes to an ACL-ID, an owner GUID and so on.

Figure 5:
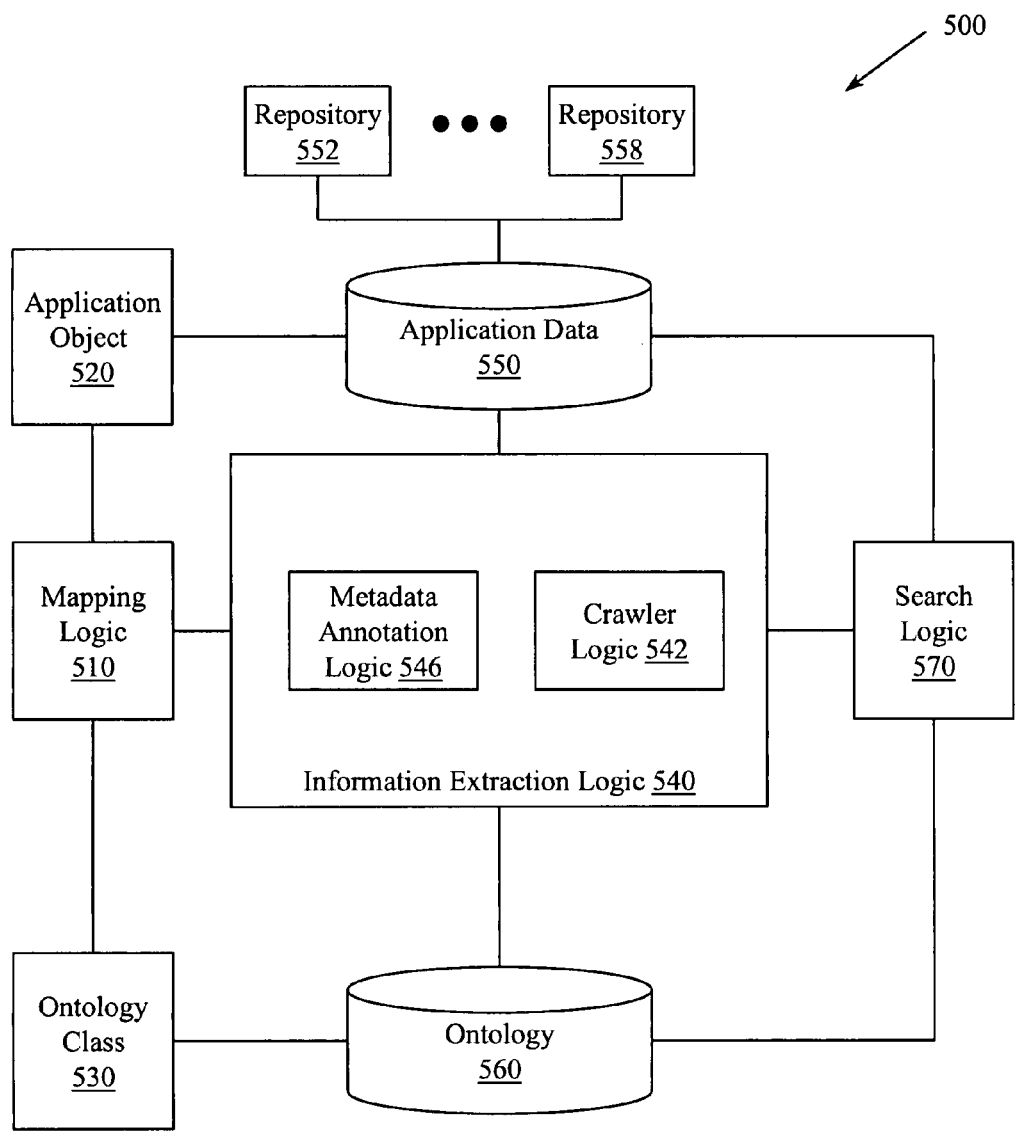
FIG. 5 illustrates an example system for applications based knowledge extraction and consolidation for automatic ontology instantiation.

FIG. 5 illustrates an example system 500 for applications based knowledge extraction and consolidation for automatic ontology instantiation. System 500 includes several elements similar to those described in connection with FIG. 3 and FIG. 4. For example, system 500 includes a mapping logic 510, an application object 520, and an ontology class 530. System 500 also includes an information extraction (IE) logic 540 that accesses application data 550 to maintain (e.g., instantiate, update) an ontology 560. The application data 550 may be stored in a set of data repositories (e.g., 552 . . . 558).

Additionally, system 500 includes a search logic 570. Search logic 570 may benefit from the work performed by IE logic 540 and the ontology 560 created and/or maintained by IE logic 540. For example, search logic 570 may accept a query and locate a document relevant to the query based on information stored in the ontology 560. The document may contain data associated with an application, where the data was characterized by the application object 520 and described in a mapping between the application object 520 and an ontology class 530. The document may have been stored in one of the data repositories (e.g., 552 . . . 558).

In one example, the search logic 570 may accept a query and locate a document relevant to the query based on the information stored in the ontology and on a semantic link. For example, two documents may include information that is relevant to the query. However a first document may be selected as being more relevant based on a semantic link to an application object. For example, a first document may have a semantic link to a human resources organization chart application object while a second document may not. If the query is seeking information relevant to the organization chart then the first document, which has the semantic link to the organization chart application object, may be returned as more relevant.

The search logic 570 may perform in different manners. For example, search logic 570 may progressively relax a query over elements in ontology 560. For example, a query may seek information relevant to emails concerning a selected matter that were sent by a first person to a second person. The search logic 570 may, therefore, first relax the query to identify a set of emails sent by the first person. The search logic 570 may then relax the query to identify emails in that set that were sent to the second person. Finally, the search logic 570 may further relax the query to identify emails concerning the selected matter. This progressive relaxation allows processing successively smaller sets of emails, which facilitates improving response times and/or accuracy.

System 500 may also include a metadata annotation logic 546. Logic 546 may add a metadata annotation to a document from which a member of the set of application data was selected. For example, application data concerning relationships between email senders and email receivers may be identified. This application data may be used to identify whether the email was an initial email. A metadata annotation concerning whether an email was an initial email may then be added to the document. Thus, a search for emails may be extended beyond simple keyword searching to include semantic searching that considers the new metadata annotation.

Figure 6:
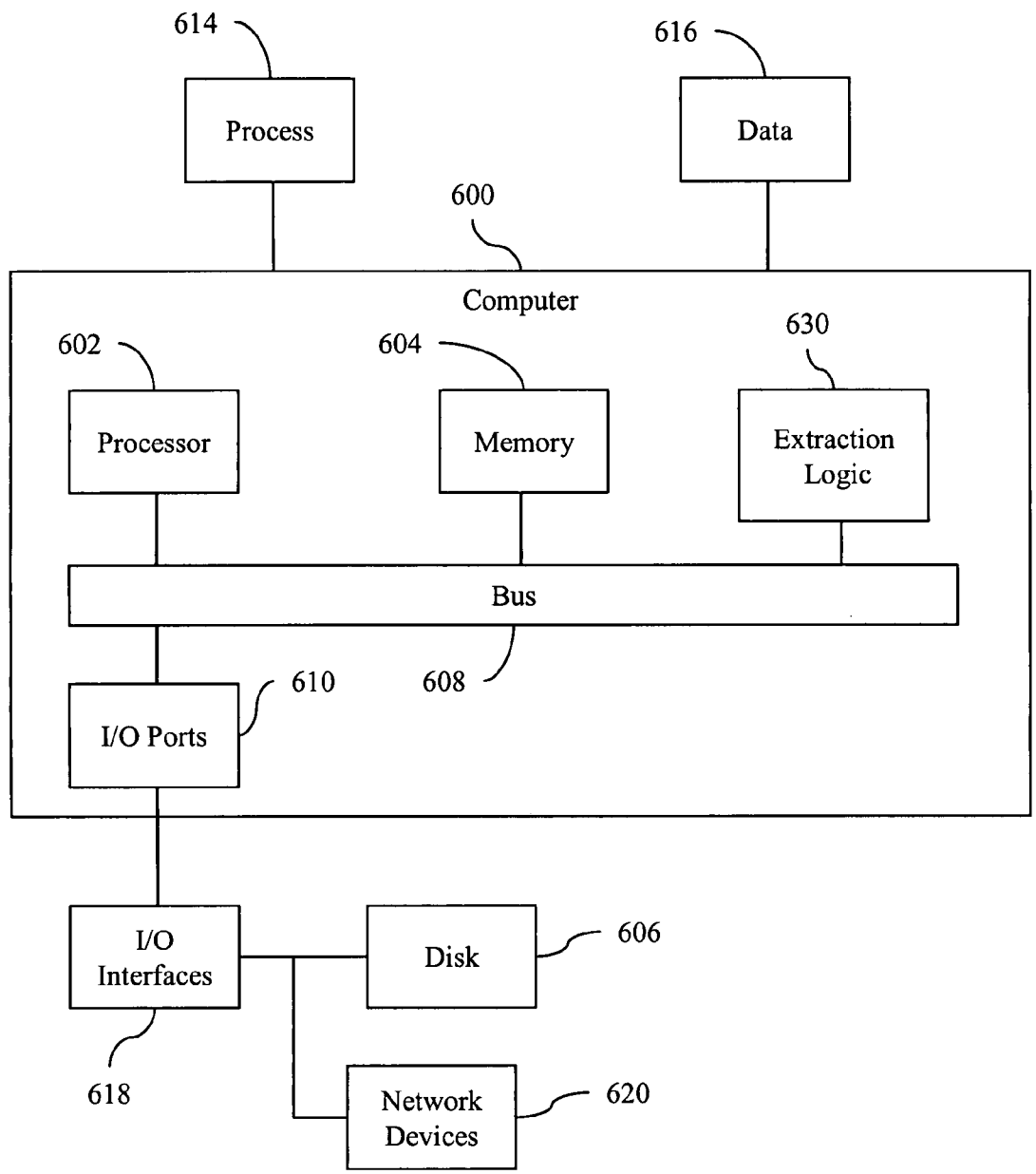
FIG. 6 illustrates an example computing environment in which portions of example systems and methods illustrated herein may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include an extraction logic 630 configured to facilitate extracting knowledge and automatically manipulating an ontology. In one example, manipulating the ontology may include instantiating the ontology. In different examples, the logic 630 may be implemented in hardware, software embodied as machine executable instructions stored on a machine-readable medium, firmware, and/or combinations thereof. Thus, the logic 630 may provide means (e.g., hardware, software embodied as machine executable instructions stored on a machine-readable medium, firmware) for crawling enterprise data. Logic 630 may also provide means (e.g., hardware, software embodied as machine executable instructions stored on a machine-readable medium, firmware) for identifying data to locate in an enterprise while crawling the enterprise data. The identifying may be based, for example, on a relationship between application data and ontology data. For example, a first piece of application data may correspond to a first ontology node, a second piece of application data may correspond to a second ontology node, and a third piece of application data may correspond to an ontology arc. Logic 630 may also provide means (e.g., hardware, software embodied as machine executable instructions stored on a machine-readable medium, firmware) for selectively updating an ontology based on data located in the enterprise. For example, data found in the enterprise may be used to add entries to an ontology when the data corresponds to ontology elements and/or to change the values of entries in the ontology. While the logic 630 is illustrated as a hardware component operably connected to the bus 608, it is to be appreciated that in one example, the logic 630 could be implemented in the processor 602.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, EPROM, and EEPROM. Volatile memory may include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a DVD, and/or a memory stick. Furthermore, the disk 606 may be a CD-ROM, a CD recordable drive (CD-R drive), a CD rewriteable drive (CD-RW drive), and/or a digital video ROM drive (DVD ROM). The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE, SATA, Infiniband, 1394, USB, Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a local area network (LAN), a wide area network (WAN), and other networks.

Some portions of the detailed descriptions that follow are presented in terms of method descriptions and representations of operations on electrical and/or magnetic signals capable of being stored, transferred, combined, compared, and otherwise manipulated in hardware. These are used by those skilled in the art to convey the substance of their work to others. A method is here, and generally, conceived to be a sequence of operations that produce a result. The operations may include physical manipulations of physical quantities. The manipulations may produce a transitory physical change like that in an electromagnetic transmission signal.

It has proven convenient at times, principally for reasons of common usage, to refer to these physical quantities, these electrical and/or magnetic signals, as bits, values, elements, symbols, characters, terms, numbers, and so on. These and similar terms are associated with appropriate physical quantities and are merely convenient labels applied to these quantities. Unless specifically stated otherwise, it is appreciated that throughout the description, terms including processing, computing, calculating, determining, displaying, automatically performing an action, and so on, refer to actions and processes of a computer system, logic, processor, or similar electronic device that manipulates and transforms data represented as physical (electric, electronic, magnetic) quantities.

Example methods may be better appreciated with reference to flow diagrams. While for purposes of simplicity of explanation, the illustrated methods are shown and described as a series of blocks, it is to be appreciated that the methods are not limited by the order of the blocks, as in different embodiments some blocks may occur in different orders and/or concurrently with other blocks from that shown and described. Moreover, less than all the illustrated blocks may be required to implement an example method. In some examples, blocks may be combined, separated into multiple components, may employ additional, not illustrated blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions. While the figures illustrate various actions occurring in serial, it is to be appreciated that in some examples various actions could occur concurrently, substantially in parallel, and/or at substantially different points in time.

Figure 7:
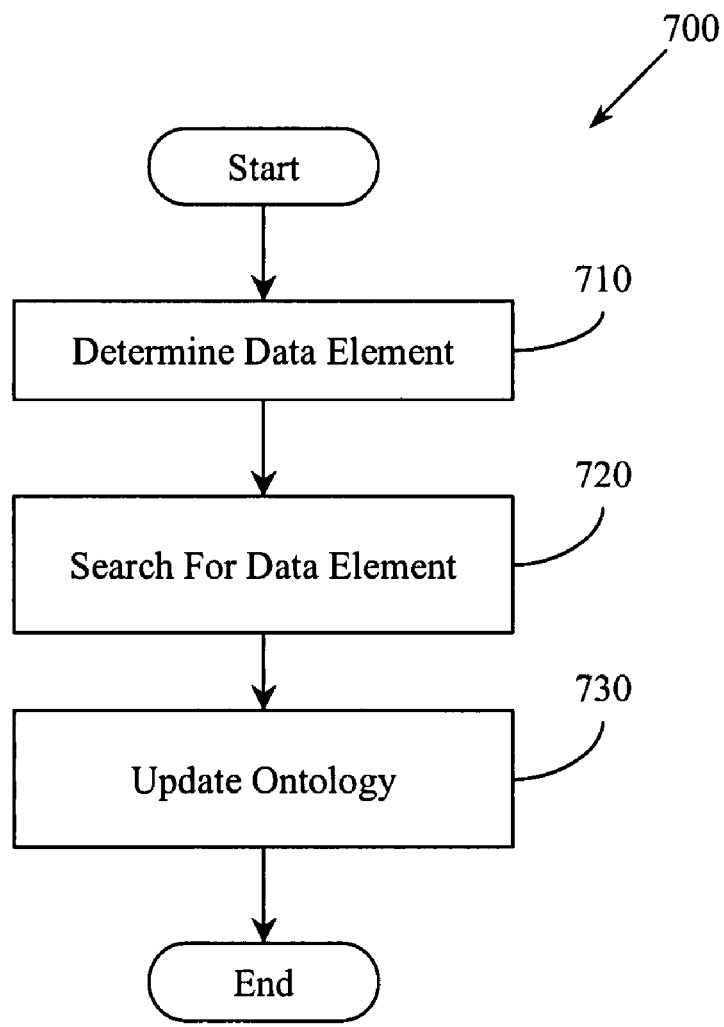
FIG. 7 illustrates an example method associated with knowledge extraction and consolidation for automatic ontology maintenance.

FIG. 7 illustrates a method 700 associated with knowledge extraction and consolidation for automatic ontology maintenance. Ontology maintenance may include, for example, instantiating an ontology, adding a value to an ontology, removing a value from an ontology, changing a value in an ontology, and so on. Method 700 may include, at 710, determining a data element to search for in application data. Determining which data element(s) to search for may be based on a relationship between the data element and an element in an ontology. For example, a mapping between the data element and the ontology element may exist. This mapping may indicate that instantiating and/or populating the ontology may be achieved, at least in part, by locating the data element and/or other data associated with that data element. The mapping may involve, for example, correlations between data elements and ontology nodes, correlations between data elements and ontology arcs, and so on.

Method 700 may also include, at 720, searching for the data element. Searching for the data element may involve performing information extraction (IE) processing. One type of IE processing that may be performed is name entity relationship (NER) processing. The data element to search for may be stored in different data repositories belonging to an enterprise. Thus, the searching at 720 may include finding and looking through these different data repositories. Searching these data repositories may be performed, for example, by a crawler. The crawler may perform an initial crawl to instantiate an ontology and then may perform additional crawls to selectively update the ontology.

Method 700 may also include, at 730, selectively updating the ontology upon locating the data element. The ontology may store data that represents nodes and arcs that model subjects and relationships between subjects. Thus, the data element that is searched for may store a value associated with a subject of a relationship between two items. Additionally, the data element may store a value associated with the relationship between two items. As the data element(s) is found, the ontology can be manipulated to reflect the presence of the data element and/or a value associated with the data element.

While FIG. 7 illustrates various actions occurring in serial, it is to be appreciated that various actions illustrated in FIG. 7 could occur substantially in parallel. By way of illustration, a first process could determine data elements, a second process could search for data elements, and a third process could update an ontology. While three processes are described, it is to be appreciated that a greater and/or lesser number of processes could be employed and that lightweight processes, regular processes, threads, and other approaches could be employed.

In one example, a method may be implemented as processor executable instructions. Thus, in one example, a machine-readable medium may store processor executable instructions that if executed by a machine (e.g., processor) cause the machine to perform a method that includes determining a data element to search for in application data where the data element is selected based on a relationship between the data element and an element in an ontology. The method may also include searching for the data element in data repositories belonging to an enterprise, and selectively updating the ontology upon locating the data element. While this method is described being stored on a machine-readable medium, it is to be appreciated that other example methods described herein may also be stored on a machine-readable medium.

Figure 8:
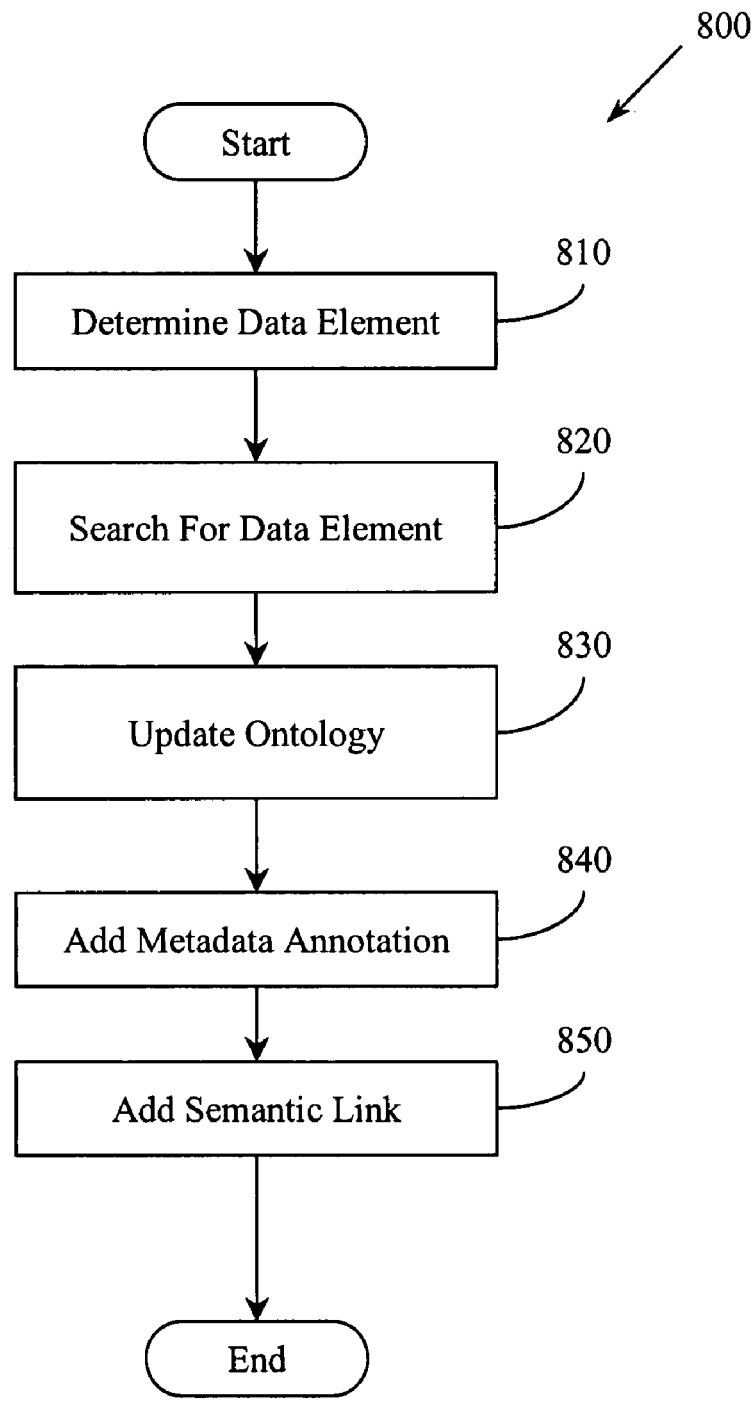
FIG. 8 illustrates an example method associated with applications based knowledge extraction and consolidation for automatic ontology instantiation.

FIG. 8 illustrates a method 800 associated with applications based knowledge extraction and consolidation for automatic ontology instantiation. Method 800 includes some elements similar to those described in connection with FIG. 7. For example, method 800 includes determining a data element to search for at 810, searching for the data element at 820, and selectively updating an ontology at 830.

Method 800 also includes additional actions. For example, method 800 includes, at 840, selectively adding a metadata annotation to a document in which a data element was located. The metadata annotation may characterize the data element and/or document in a way that facilitates determining that the document is relevant to a query. For example, a document storing unstructured data in an unstructured repository may have a metadata annotation added to it that adds some structure. Consider the email example described above. A metadata annotation identifying an email as the first email in a chain or the last email in a chain can be added to a stored email to facilitate satisfying a semantic query that asks for "initial" or "terminal" emails related to a certain subject.

Method 800 may also include, at 850, establishing a semantic link between a document in which a data element was located and an application object. This semantic link may also identify the document in a way that facilitates determining that the document is relevant to a query. Consider the email and organization chart examples described above. A semantic link can be added to link an email to an organization chart application object. This email may then be determined to be relevant to queries that are looking for emails related to creating the organization chart. An email may have been sent between two people but neither the subject nor the body may have mentioned the organization chart. This email would not likely be conventionally returned. However, the semantic link would make this email more likely to be returned.

Figure 9:
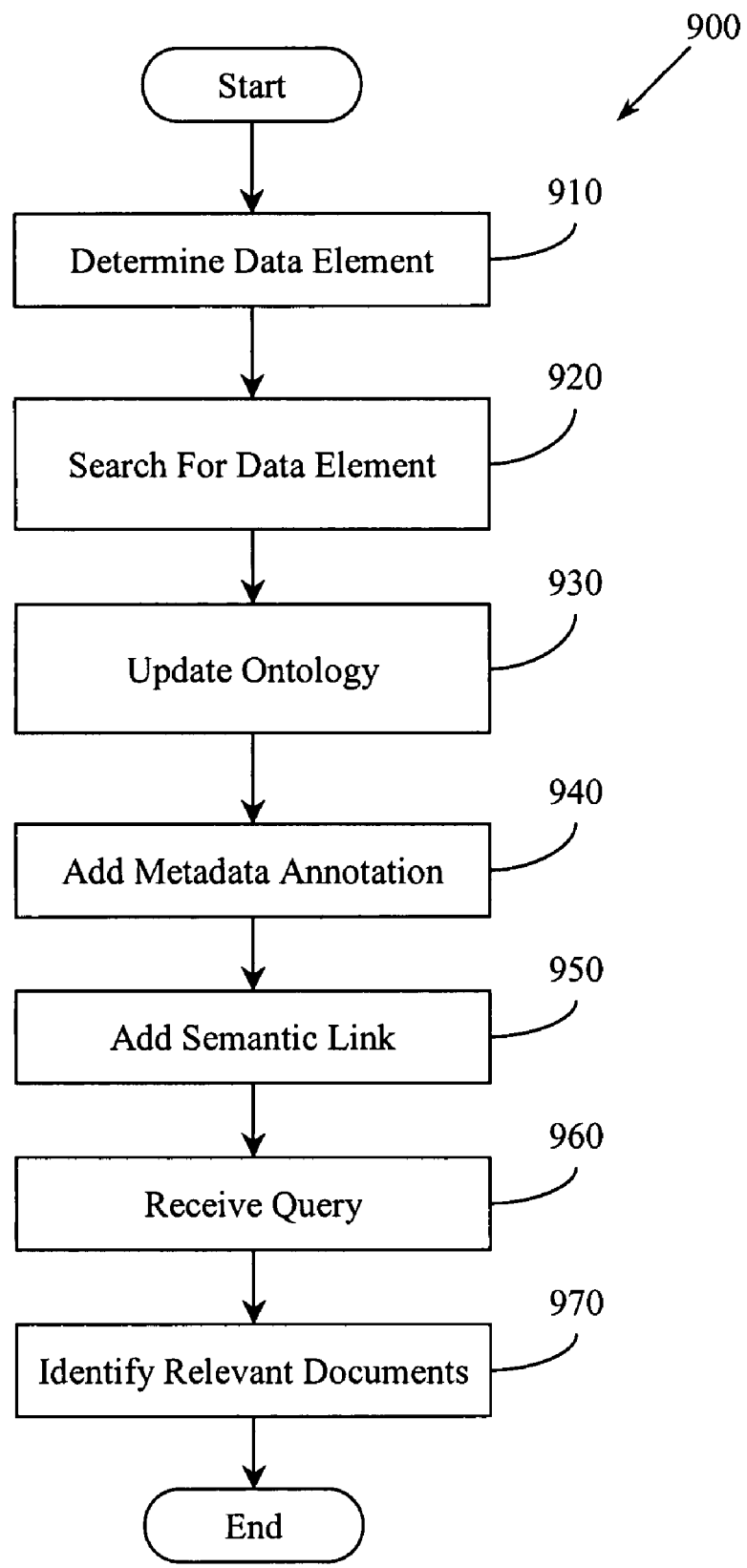
FIG. 9 illustrates an example method associated with applications based knowledge extraction and consolidation for automatic ontology instantiation.

FIG. 9 illustrates a method 900 associated with applications based knowledge extraction and consolidation for automatic ontology instantiation. Method 900 includes some elements similar to those described in connection with FIGS. 7 and 8. For example, method 900 includes determining a data element to search for at 910, searching for the data element at 920, selectively updating an ontology at 930, adding a metadata annotation 940, and adding a semantic link at 950. One reason to perform the processing from 910 to 950 is to build infrastructure to support searches.

Thus, method 900 includes receiving a query at 960. With the query in hand, method 900 then proceeds, at 970, to identify a document relevant to the query. Since the method 900 has maintained the ontology, identifying the document at 970 includes processing data stored in the ontology. The data stored in the ontology may be used in different ways. For example, identifying the document at 970 may include selectively progressively relaxing a query over an ontology element(s). For example, a query may seek documents concerning people (e.g., person1, person2) and/or types of people (e.g., email senders, email forwarders). Thus, the query may be relaxed over a first ontology arc (e.g., email forwarders) and then over a first ontology node (e.g., person name). This facilitates reducing a search space, which in turn facilitates improving response time and accuracy.

The ontology is not the only infrastructure that method 900 has available. Thus, identifying the document may include finding and/or evaluating a semantic link. The infrastructure may be used in isolation and/or in combination. Thus, a document may be identified at 970 as being relevant to a query based on an ontology element value, a semantic link, and a metadata annotation. Furthermore, the query may be selectively relaxed over these items.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A system, comprising:
    a mapping logic, embodied as machine-executable instructions stored on a non-transitory machine readable medium, to create a mapping between an application object and an ontology data element, where the ontology describes a structure of application objects in an application; and
    an information extraction (IE) logic, embodied as machine-executable instructions stored on a non-transitory machine readable medium:
        to access the mapping logic to identify an one or more ontology data elements, the identification being based, at least in part, on the mapping between the application object that characterizes an application data element and the ontology data element, application data elements being stored in one or more application data repositories belonging to an enterprise;
        to locate the ontology data element in documents stored in the one or more data repositories; and
        to create a link between respective documents from which an ontology data element is selected and the respective applications having an application object mapped to the ontology data element located in the respective documents, where the link is appended to the document for use in future processing.

2. The system of claim 1, where the IE logic includes a name entity relation (NER) logic to locate ontology data elements, the NER logic being controlled, at least in part, by the mapping between the application object and the ontology data element.

3. The system of claim 2, the NER logic being configured to generate a gazetteer for an NER object.

4. The system of claim 1, where the IE logic includes a crawler logic to initially crawl the application data to select application objects upon which the ontology may be manipulated.

5. The system of claim 1, including a search logic:
    to accept a query; and
    to locate a document relevant to the query based, at least in part, on the information stored in the ontology, the document being stored in one of the one or more data repositories.

6. The system of claim 5, the search logic to progressively relax the query over one or more ontology data elements.

7. The system of claim 1, including a metadata annotation logic to add a metadata annotation to a document from which an ontology data element was selected, the annotation being based, at least in part, on a value of the ontology data element.

8. The system of claim 1, where the link facilitates navigation between the respective document and the respective applications having an application object mapped to the ontology data element located in the respective documents.

9. A non-transitory machine-readable medium having stored thereon machine-executable instructions that if executed by a machine cause the machine to perform a method, the method comprising:
   accessing an ontology that describes a structure of application data stored in an application, where the ontology includes respective ontology data elements mapped to respective application objects that characterize application data elements;
   searching for and selecting one or more data elements in one or more documents belonging to an enterprise; and
   upon locating an ontology data element in a document, creating a link between the document and the application data mapped to the ontology data element, where the link is appended to the document for future processing.

10. The non-transitory machine-readable medium of claim 9 where accessing the ontology comprises accessing a gazetteer that lists ontology data elements.

11. The non-transitory machine-readable medium of claim 9, where searching for the data element includes crawling the enterprise to search for the ontology data element.

12. The non-transitory machine-readable medium of claim 9, where locating the ontology data element includes performing name entity relationship processing on the application data.

13. The non-transitory machine-readable medium of claim 9, where creating a link is performed by adding a metadata annotation to a document in which a data element was located.

14. The non-transitory machine-readable medium of claim 9, including receiving a query and identifying a document relevant to the query based, at least in part, on the ontology.

15. The non-transitory machine-readable medium of claim 9, including receiving a query selectively progressively relaxing the query over one or more ontology elements by adding query terms corresponding to one or more ontology data elements.

16. The non-transitory machine-readable medium of claim 14, including identifying a document relevant to the query based, at least in part, on a semantic link.

17. The non-transitory machine-readable medium of claim 14, including receiving a query and identifying a document relevant to query based on an ontology data element value, a semantic link, and a metadata annotation, and including selectively progressively relaxing the query over one or more ontology data elements.

18. A non-transitory machine-readable medium having stored thereon machine-executable instructions that if executed by a machine cause the machine to perform a method, the method comprising:
   upon selecting an ontology data element in a document, creating a link between the document and an application object that characterizes an application data element mapped to the ontology data element, where the link is appended to the document for future processing;
   receiving a query on one or more data repositories that stores documents that have the links to application data that is mapped to one or more ontology data elements;
   accessing an ontology that includes a collection of ontology data elements that are related to one another to define a structure of the application data;
   determining a query element that is related to an ontology data element;
   modifying the query to include the determined ontology data element or one or more ontology data elements that are related to the identified ontology data element;
   executing the modified query to search for a document in the one or more data repositories; and
   returning documents that meet the modified query.

19. A system, comprising:
   means for accessing an ontology that describes a structure of application data elements stored in an application, where the ontology includes respective ontology data elements mapped to respective application objects that characterizes an application data element;
   means for searching for one or more data elements in one or more documents belonging to an enterprise;
   means for creating a link between the document and the application data mapped to the ontology data upon selecting an ontology data element in a document, where the link is appended to the document for future processing; and
   means for storing the application data mapped to the ontology data and the document in one or more electronic data repositories.

20. The machine-readable medium of claim 18 where executing the query comprises searching for the ontology data elements in metadata associated with documents in the one or more data repositories.

21. A computer implemented method comprising:
   accessing an ontology that describes a structure of application data stored in an application; where the ontology includes respective ontology data elements mapped to respective application objects that characterizes an application data element;
   searching for one or more data elements in one or more documents stored in an electronic data repository belonging to an enterprise;
   upon locating and selecting an ontology data element in a document, creating a link between the document and the application data mapped to the ontology data; and
   storing the document and the created link in the electronic data repository.

22. The method of claim 21, where accessing the ontology comprises accessing a gazetteer that lists ontology data elements.

23. The method of claim 21, where searching for the data element includes crawling the enterprise to search for the ontology data element.

24. The method of claim 21, where locating the ontology data element includes performing name entity relationship processing on the application data.

25. The method of claim 21, where creating a link is performed by adding a metadata annotation to a document in which a data element was located.

26. The method of claim 21, including receiving a query and identifying a document relevant to the query based, at least in part, on the ontology.

27. The method of claim 26, including identifying a document relevant to the query based, at least in part, on a semantic link.

28. The method of claim 21, including receiving a query selectively progressively relaxing the query over one or more ontology elements by adding query terms corresponding to one or more ontology data elements.

29. The method of claim 21, including receiving a query and identifying a document relevant to query based on an ontology data element value, a semantic link, and a metadata annotation, and including selectively progressively relaxing the query over one or more ontology data elements.

* * * * *